United States Patent [19]

Illy et al.

[11] Patent Number: 5,014,611
[45] Date of Patent: May 14, 1991

[54] COFFEE MACHINE

[75] Inventors: Ernesto Illy; Furio Suggi Liverani, both of Trieste, Italy

[73] Assignee: Illycaffe' S.p.A., Trieste, Italy

[21] Appl. No.: 454,915

[22] Filed: Dec. 22, 1989

[30] Foreign Application Priority Data

Jan. 30, 1989 [IT] Italy .................. 19247 A/89

[51] Int. Cl.⁵ .................. A47J 31/52; A47J 31/54
[52] U.S. Cl. .................. 99/280; 99/281
[58] Field of Search .................. 99/279, 280, 281, 282, 99/283, 295, 300, 302 R, 307; 426/433; 219/490, 492, 494

[56] References Cited

U.S. PATENT DOCUMENTS

| | | | |
|---|---|---|---|
| 4,330,702 | 5/1982 | Cheng | 99/281 |
| 4,406,217 | 9/1983 | Oota | 99/282 |
| 4,583,449 | 4/1986 | Dangel et al. | 99/279 |
| 4,886,955 | 12/1989 | Kimura | 99/281 |

*Primary Examiner*—Robert W. Jenkins
*Attorney, Agent, or Firm*—Keil & Weinkauf

[57] ABSTRACT

A coffee machine wherefrom an user may optionally request different coffees as to the volume of beverage and wherein the infusion water temperature in a heater (7) is made to lower as the quantity of the requested beverage increases; to this purpose, the machine is provided with a control means assembly comprising: a meter (12, 24) for the quantity of water moving to an extraction chamber (3), a temperature transducer (13) for sensing the temperatures the water achieves in the heater (7) and a calculator (14) adapted to receive the signals from said meter (12, 24) and temperature transducer (13) and control, according to a given algorithm, the water temperature in the heater (7) as a function of the moving water quantity.

8 Claims, 2 Drawing Sheets

COFFEE MACHINE

This present invention relates to a coffee machine; in particular the invention relates to a machine whereby the coffee beverage, brewed from a controlled hot water flow (said—infusion water—hereinafter) impacting a coffee pad in an extraction chamber, may be alternatively a standard coffee having about 40 cm³ beverage volume, for an user wishing to taste the full flavour of the express coffee, or a bigger volume coffee beverage, for instance 120 cm³, for an user wishing a "long coffee", as generally a coffee bigger than the standard one is called. The beverage is brewed once infusion water of substantially constant temperature is made to pass through a coffee pad in the extraction chamber, said temperature being achieved in a heater (boiler, heat exchanger). A drawback in the known machines is that the taste of long coffee beverages is not agreable. It was found that said drawback is due to spoiling substances being extracted from a coffee pad in case the quantity of infusion water is bigger than the quantity corresponding to a standard coffee; infact, said spoiling substances start being extracted early after the infusion water starts passing through the coffee pad, at the maximum infusion temperature achieved in the heater. The inventor found that extraction of spoiling substances from a coffee pad due to an extended water passage does no longer occur provided the water passes through the pad as its temperature lowers with respect to the maximum starting temperature. A time period of 20-30 seconds is generally necessary to brew a standard coffee and this time period is not enough to spoiling substances be transferred in notable quantities into the infusion; about and within said time period of 20-30 seconds the spoiling substances start to pass into the beverage in notable quantities in case the infusion water temperature is still the temperature that the water achieves generally in the coffee machine, such a temperature varying between 90° C. and 100° C.

This invention intends to obviate said drawback; this coffee machine is adapted to impart an agreable taste both to a standard and long coffee.

The invented coffee machine comprises a water source, means for moving said water to a coffee beverage extraction chamber, means for converting said source water into infusion water at a given starting infusion temperature, usually varying from 90° C. to 100° C., and control means for controlling the infusion water temperature as a function of the quantity Q of infusion water moving to the extraction chamber (which water will be referred to as—moving water—hereinafter), in particular for keeping or just lowering said infusion water starting temperature for a standard coffee (also referred to as—a coffee beverage of a given first volume—) and then for lowering under a controlled rate the temperature of the further water quantity that should be moved to the extraction chamber for brewing a long coffee (also referred to as—a coffee beverage of a volume bigger than said given first volume—).

The control means of the invented machine is adapted to receive signals related to the moving water quantity, which signals will be referred to as—flow signals—hereinafter, and receive temperature signals from a temperature transducer associated with the heater in order to sense the temperature of the water in the heater; said control means develops a given algorithm whereby said flow signals and temperature signals are processed to control the heat supplier in the heater (electric resistance, flame) and to make the temperature of said heater, and so the temperature of the infusion water, to vary as a function of said moving water quantity.

The invented machine may be made in different ways. For instance, for giving an user the options: select between a standard coffee and a long coffee only; select among a number of given beverage volumes; select a coffee beverage having any volume comprised between a minimum and a maximum volume. In the latter option, the user will keep the delivery push button pressed until a coffee beverage having the required vulume is delivered.

An embodiment of the invention is described in detail herebelow with reference to the accompanying drawings which illustrate as an example two specific executions and wherein.

Figure 1:
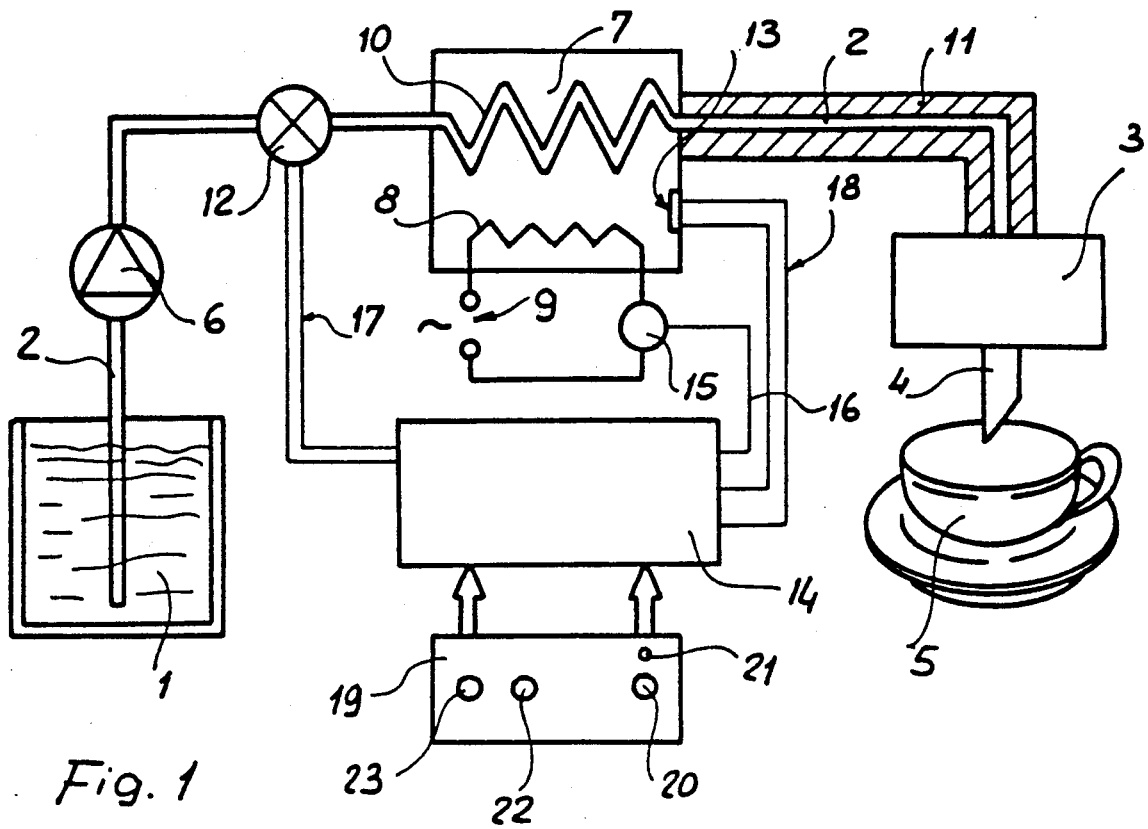
FIG. 1 is a diagram of a first coffee machine.

FIG. 1 shows the parts of a coffee machine as required for operation and for providing a description thereof. The machine comprises a water reservoir 1 wherefrom a duct 2 intakes water for moving it to an extraction chamber 3. This extraction chamber is adapted to receive a coffee cartridge, not shown, as a metered portion of roasted and ground coffee contained and compressed within two sheets of water permeable paper. At the bottom of the extraction chamber there is a delivery spout 4 for making coffee beverage to fall into a cup 5. A pump 6 is associated with duct 2 for drawing water from the reservoir 1 and moving said water to the extraction chamber 3 after passing said water through a heat exchanger 7 incorporating an electric resistance 8 energized from an electric power source 9. A coil portion 10 of duct 2 is incorporated into the heat exchanger 7. The heat inertia of such heat exchanger is so low that the temperature of the passing through water and of the heat exchanger itself substantially vary together; so, measuring the heat exchanger temperature is the same as measuring the temperature of the crossing through water. The duct 2 section between heat exchanger 7 and extraction chamber 3 is covered with a heat insulating sleeve 11 to prevent moving water from losing heat notably. A control means assembly comprises: a flow transducer 12 in the duct 2, a temperature transducer 13 associated with the heat exchanger 7 and a microcontroller 14, which is a unit PLC Festo 404. Said microcontroller is programmed to control the water temperature T in the heat exchanger 7 as a function of the moving water volume V, according to the function $T=f(V)$ shown in FIG. 2, in cooperation with flow transducer 12 and temperature transducer 13. Said microcontroller 14 makes a mathematic integration of the flow signals and processes the integrated values and the temperature signals for making a pulsed control on the electric resistance 8. Such a control is carried out by a switch 15 in the circuit of the electric resistance 8; said switch is connected by the connection wire 16 with the microcontroller 14 which conveniently controls the opening and closing of said switch 15. The flow transducer 12 is connected with the control means 14 by the connecting wire 17 and the temperature transducer 13 is connected with said microcontroller 14 by a connecting wire 18. A control board 19 is associated with the microcontroller 14 and comprises a push button 20 for operating the machine, a light 21 that lights when the heat exchanger 7 achieves the starting temperature of 98° C., a push button 22 for requesting a coffee having 40 cm³ volume (standard coffee) and a push button 23 for requesting a coffee having 100 cm³ volume (long coffee).

Figure 2:
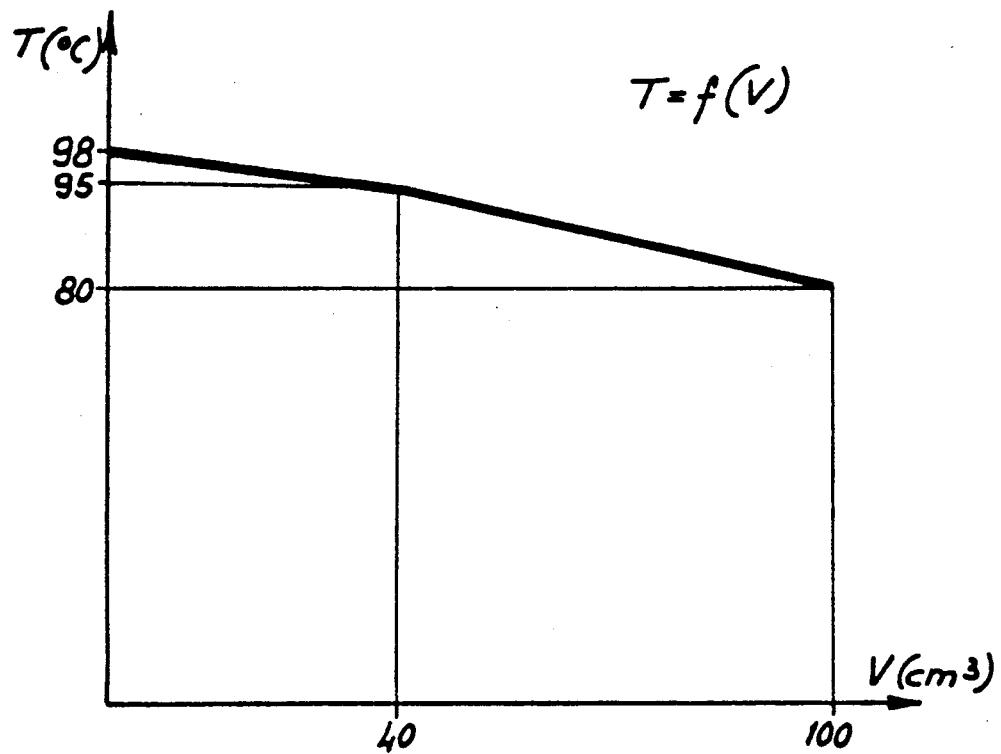
FIG. 2 is a diagram showing a first variation law of the infusion water temperature as a function of the moving water quantity.

FIG. 2 shows how the water starting temperature 98° C. in the heat exchanger 7 is made to lower gradually to 95° C. once a standard coffee is requested and how said temperature is made to lower gradually from 95° C. to 80° C. once a long coffee is requested.

The machine operation according to the algorithm as developped by said microcontroller is summarised herebelow.

(a) the machine is operated by pressing the push button 20, switch 15 is closed and electric resistance 8 is energised, (b) once the water temperature in the heat exchanger 7 achieves the starting value of 98° C. by the electric resistance 8, the light 21 lithts, (c) as an user requests a coffee, pump 6 is actuated and microcomputer 14 processes the signals received through flow transducer 12 and temperature transducer 13:

if a standard coffee is requested, the brewing of such a coffee is controlled: with the moving water volume V varying from 0 to 40 cm³, the temperature T of the water in the heater 7 is made to lower gradually from 98° C. to 95° C.;

if a long coffee is requested, the brewing of such a coffee is controlled: for each cm³ of water moved in addition to said 40 cm³, the temperature T of the water in the heater 7 is made to lower gradually by a given value until said temperature is 80° C. when the total moved volume is 100 cm³.

(d) once the requested coffee is delivered, the water temperature in the heat exchanger 7 is made to rise up to 98° C. and is kept at such a value.

Figure 3:
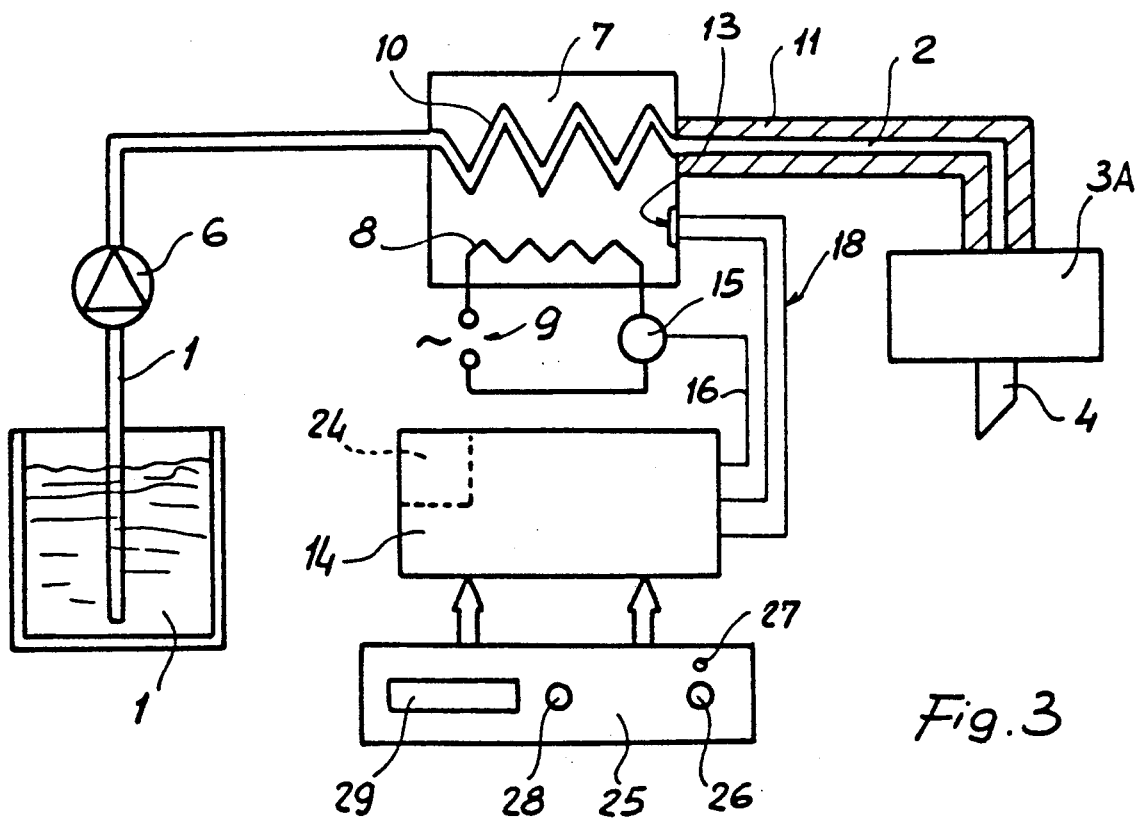
FIG. 3 is a diagram of a second coffee machine and FIG. 4 is a diagram showing a second variation law of the infusion water temperature as a function of the moving water quantity.
Figure 4:
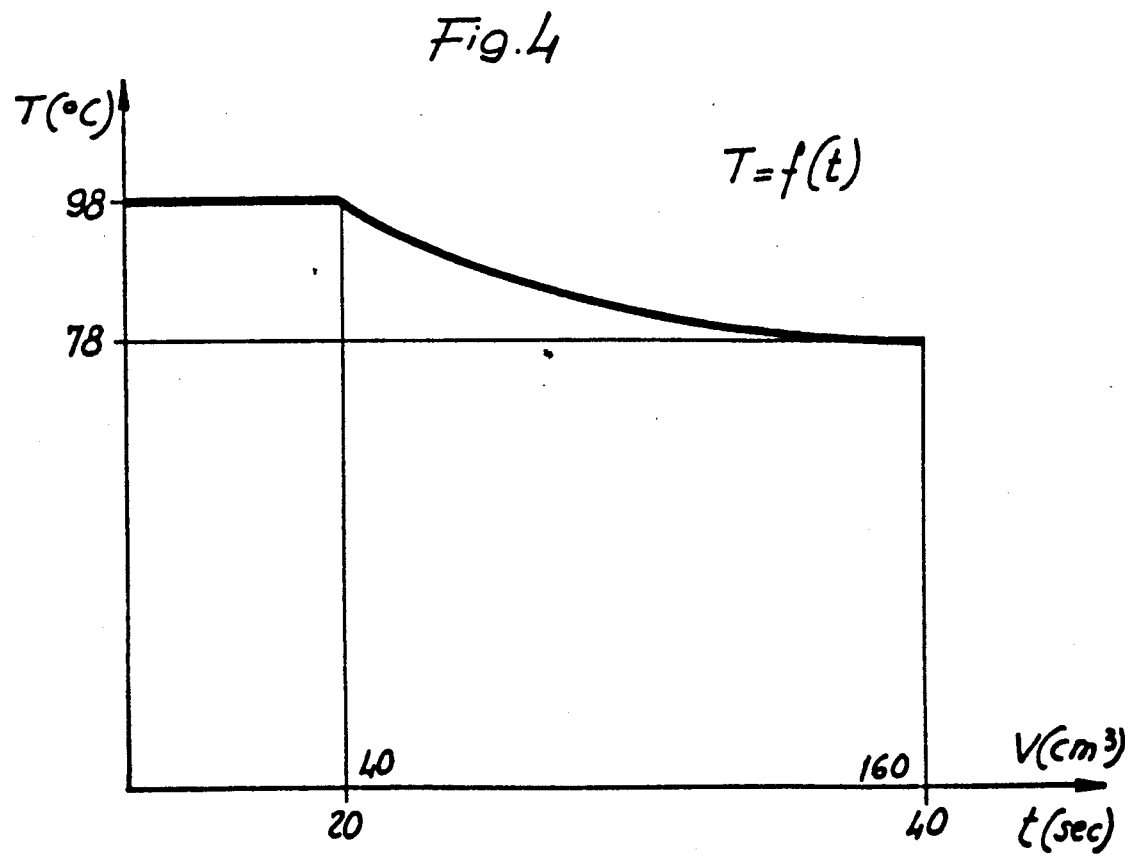

FIG. 3 shows a conventional express coffee machine adapted to a bar. This machine has a number of parts common with the machine illustrated in FIG. 1; such common parts have same reference numbers in the two figures and are not described. The extraction chamber 3A of latter machine is adapted to receive a charge of ground coffee in a conventional filter-box, not shown. The control means 14 comprises a clock 24 which starts as soon as an user starts operating the machine, viz. when he operates the control board 25 the pump 6 is actuated and said control means comprises a microprocessor schedule programmed for controlling, according to function T=f(t) of FIG. 4, the water temperature in the heat exchanger 7 as a function of time period t counted by the clock 24 that starts counting as soon as pump 6 starts (operation starting) and, then, indirectly, for controlling the quantity Q of the moving water. The control board 25, associated with the control means 14, presents a push button 26 for operating the machine, a light 27 which ligths as soon as the water in the heat exchanger 7 achieves the starting temperature of 98° C., a push button 28 for requesting a coffee and liquid crystal display 29 which shows serially water volumes expressed in cm³ as such volumes are moved to the extraction chamber, up to a maximum volume of 160 cm³. The control means develops an algorithm according to FIG. 4 and an user keeps pressed the push button 28 for requesting a coffee of any volume to his choice, comprised between 40 cm³ and 160 cm³. On request of a coffee, the moving water 98° C. starting temperature is kept substantially constant until the clock counting arrives to 20 seconds which correspond to 40 cm³ volume of moving water, after that said temperature is made to lower gradually under control, as shown in FIG. 4, down to 78° C. as soon as the clock counting arrives to 40 seconds, which correspond to 160 cm³ moving water volume. Now, pump 6 is deenergised and the operation ends.

We claim:

1. A coffee machine adapted to deliver in a cup (5) coffee beverages that may have different volumes containing a water source (1), moving means (6) for moving water from said source (1) to an extraction chamber (3) through a heating means (7) adapted to convert immediately the source water into infusion water at a given starting temperature (90° C.-100° C.) and operation means (19) for a consumer characterised in that it comprises an assembly of control means wherein there is a meter (12, 24) for measuring the quantity (Q) of water moving to the extraction chamber (3), a temperature transducer (13) for the temperature of said moving water and a control means (14) adapted to receive the signals from said meter (12, 24) and temperature transducer (13) and to process said signals according to a given algorithm for controlling the temperature of said moving water as a function of the quantity of said moving water /T=f(Q)/.

2. A coffee machine according to claim 1 characterised in that said assembly of control means comprises a flow transducer (12) for measuring the volumes (V) of moving water, a temperature transducer (13) for measuring the temperatures of said moving water and a control means (14) programmed for processing according to a given algorithm the signals received from said flow and temperature transducers (12, 13) and controlling the temperature of said moving water as a function of the volume of same moving water /T=f(V)/.

3. A coffee machine according to claim 1 characterised in that said assembly of control means comprises a clock (24) that measures the time period (t) along which said moving means (6) operates for moving said moving water, a temperature transducer (13) for measuring the temperatures of said moving water, a control means (14) programmed for processing according to a given algorithm the signals received from said clock (24) and temperature transducer (13) and controlling the temperature of said moving water as a function of the time /T=f(t)/ as measured by said clock (24).

4. A coffee machine according to claim 1 characterised in that said control means (14) is programmed for carrying out the steps of: (a) keeping at a given starting temperature (98° C.) the moving water until a given first volume of infusion water (40 cm³) for a standard coffee is moved to the extraction chamber (3, 3A); (b) lowering gradually the moving water temperature until a given second volume of infusion water (100/160 cm³) for a long coffee achieves a given final temperature (78° C.; 80° C.).

5. A coffee machine according to claim 1 characterised in that said control means (14) is programmed for carrying out the steps of: (a) lowering gradually from a given starting temperature (98° C.) to a given first final temperature (95° C.) the temperature of the moving water quantity as such quantity passes from 0 cm$^3$ to a given starting volume (40 cm$^3$) for a standard coffee; (b) lowering gradually from said first final temperature (95° C.) to a given second final temperature (78° C.; 80° C.) the temperature of moving water quantity as such quantity passes from said starting volume (40 cm$^3$) to a final volume (100/160 cm$^3$) for a long coffee.

6. A coffee machine according to claim 1 characterised in that said control means (14) is programmed for alternatively supplying:
- a coffee beverage having said given first volume (40 cm$^3$),
- a coffee beverage having a volume bigger than said given first volume (120 cm$^3$).

7. A coffee machine according to claim 1 characterised in that said control means is programmed for alternatively supplying:
- a coffee beverage having said given first volume (40 cm$^3$),
- a coffee beverage having a volume bigger than said given first volume, which bigger volume may be selected among a given number of different volumes (60/100/120/140/160 cm$^3$) comprised between said given first volume (40 cm$^3$) and a maximum volume (160 cm$^3$).

8. A coffee machine according to claim 1 characterised in that said control means (14) is programmed for alternatively supplying:
- a coffee beverage having said given first volume,
- a coffee beverage having any volume bigger than said given first volume, which bigger volume is comprised between said given first volume (40 cm$^3$) and a given maximum volume (160 cm$^3$).

* * * * *